United States Patent [19]

Hitomi et al.

[11] Patent Number: 5,074,258
[45] Date of Patent: Dec. 24, 1991

[54] INTAKE SYSTEM FOR MULTIPLE-CYLINDER ENGINE

[75] Inventors: Mitsuo Hitomi; Toshihiko Hattori; Masashi Marubara; Mikihito Fujii, all of Hiroshima, Japan

[73] Assignee: Mazda Motor Corporation, Hiroshima, Japan

[21] Appl. No.: 577,005

[22] Filed: Sep. 4, 1990

[30] Foreign Application Priority Data

Sep. 5, 1989 [JP] Japan .................. 1-230613

[51] Int. Cl.$^5$ .......................................... F02M 35/10
[52] U.S. Cl. ............................................ 123/52 MB
[58] Field of Search ........ 123/52 M, 52 MV, 52 MC, 123/52 MB, 52 MF

[56] References Cited

U.S. PATENT DOCUMENTS

| | | | |
|---|---|---|---|
| 3,945,357 | 3/1976 | Ableitner | 123/52 M |
| 4,731,995 | 3/1988 | McFarland | 123/52 MC |
| 4,794,886 | 1/1989 | Iwamuro et al. | 123/52 MC |

FOREIGN PATENT DOCUMENTS

| | | | |
|---|---|---|---|
| 57-101367 | 12/1982 | Japan . | |
| 60-88062 | 6/1985 | Japan . | |
| 0018178 | 1/1988 | Japan | 123/52 M |

Primary Examiner—David A. Okonsky
Attorney, Agent, or Firm—Sixbey, Friedman, Leedom & Ferguson

[57] ABSTRACT

An intake system for a multiple-cylinder engine has a plurality of discrete intake passages which are substantially equal to each other in length and are connected to the respective cylinders at their downstream ends. The upstream ends of the discrete intake passages are merged into an integrated chamber, and an upstream side intake passage communicates the integrated chamber with the atmosphere. The integrated chamber has an upstream side end face and a downstream side end face, and the cross-sectional area of the integrated chamber increases from the upstream side end face to the downstream side end face, the upstream side intake passage having opening into the integrated portion in the upstream side end face, and the discrete intake passages respectively having openings into the integrated chamber in the downstream side end face. The area of the upstream side and downstream side end faces of the integrated chamber $S_0$ $S_1$, the sum of the areas of the openings of the discrete intake passages into the integrated chamber $S_N$ and the distance H between the upstream side and downstream side end faces of the integrated chamber satisfy the following formulae $$S_0 > 0.25 \times S_N$$

$$H/\sqrt{S_1} > 0.7 \times (S_1/S_0)$$

10 Claims, 8 Drawing Sheets

CONTROL

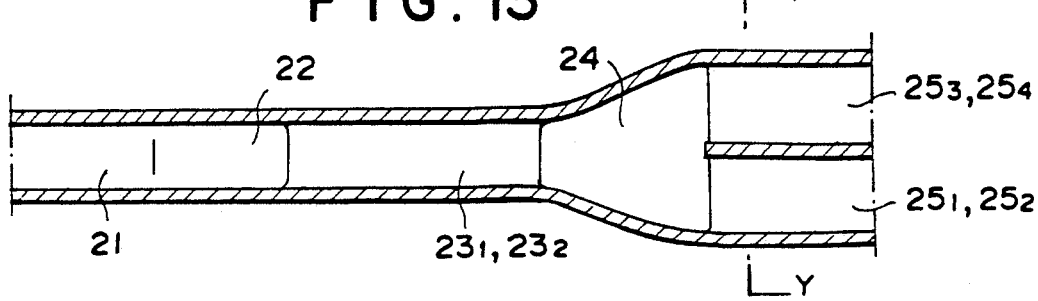
F I G. 13
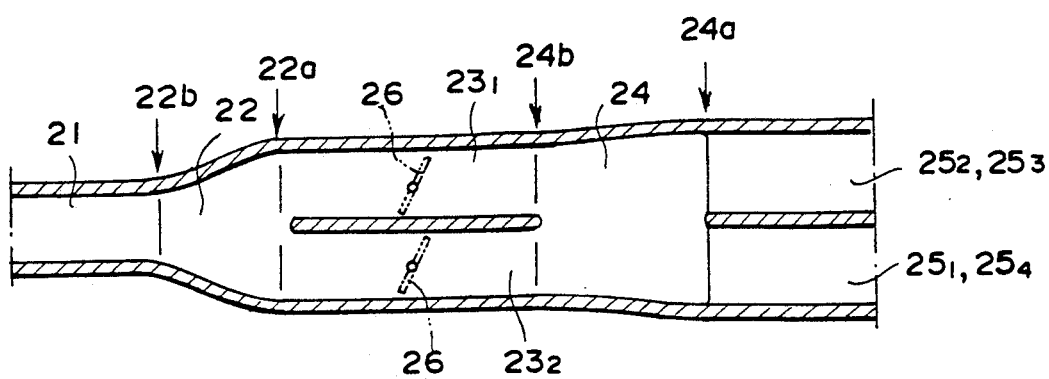
F I G. 14
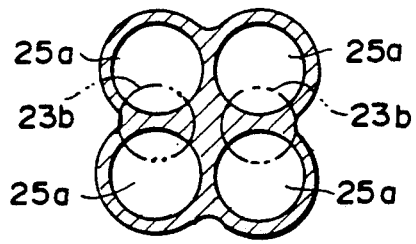
F I G. 15
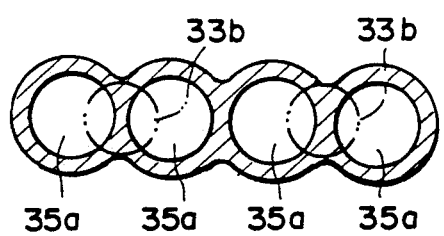
F I G. 16
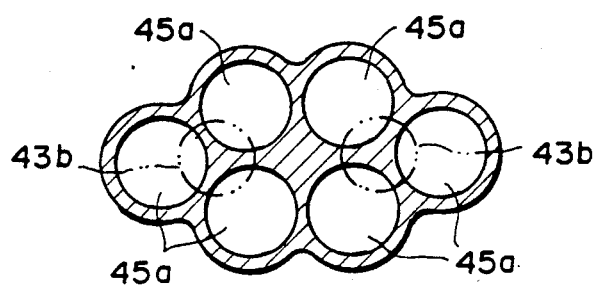
F I G. 17

INTAKE SYSTEM FOR MULTIPLE-CYLINDER ENGINE

BACKGROUND OF THE INVENTION

1. Field of the Invention

This invention relates to an intake system for a multiple-cylinder engine, and more particularly to an intake system for a multiple-cylinder engine comprising a plurality of discrete intake passages which are connected to respective cylinders at their downstream ends, an integrated chamber into which the upstream ends of the discrete intake passages are merged, and an upstream side intake passage which communicates the integrated chamber with the atmosphere.

2. Description of the Prior Art

Recently, in an engine for a vehicle, it has been proposed to increase the charging efficiency by the use of kinetic effect of intake air in the intake system. In such a case, an integrated portion such as a surge tank to which an upstream side intake passage from an air cleaner is connected is provided in the intake system, and discrete intake passages branch off from the integrated portion and communicate with respective cylinders. In such an intake system, negative pressure wave generated in the downstream end portion of the discrete intake passage upon opening of the intake valve is inverted into positive pressure wave at the integrated portion which functions as a space open to the atmosphere and the engine is supercharged by virtue of the positive pressure wave, whereby the charging efficiency is improved and the engine output power is increased.

In the conventional system, as the integrated portion, there has been wide used a surge tank type integrated portion in which the upstream side intake passage is connected to one end face of the integrated portion or the center of one side face of the same, and the discrete intake passages are connected to the side faces of the same. In such an integrated portion, the distances between the junction of the upstream side intake passage to the integrated portion and the junctions of the respective discrete intake passages to the integrated portion inherently differ from each other and/or the lengths of the respective discrete intake passages inherently differ from each other. Accordingly, distribution of intake air to the respective cylinders cannot be uniform, and the kinetic effect of intake air cannot uniformly act on the respective cylinders. Further, since the flow path of intake air from the junction of the upstream side intake passage to the junction of each discrete intake passage makes a sharp bend, intake resistance of intake air increases.

In order to overcome these problems, there have been proposed various intake systems.

For example, the intake system disclosed in Japanese Unexamined Utility Model Publication No. 60(1985)-88062 has an integrated portion A as shown in FIG. 18. The integrated portion A is substantially a truncated cone in shape. The upstream side intake passage is connected to the end face of the integrated portion having a smaller diameter, and the discrete intake passages C are connected to the end face of the same having a larger diameter. B denotes the opening of the upstream side intake passage into the integrated portion A. The openings of the discrete intake passages C are arranged in the larger diameter end face symmetrically about axis L—L passing through the center of the opening B. With this arrangement, the distances between the opening B and the openings of the respective discrete intake passages C can be substantially equal to each other, and distribution of intake air to the respective cylinders can be uniform. Further, the flow path of intake air can be substantially straight and intake resistance is reduced. Further, since the openings of the respective discrete intake passages C into the downstream side end face are disposed near to each other, each discrete intake passage C functions as a space open to the atmosphere for the other discrete intake passages with respect to inertia effect of intake air and accordingly, the volume of the integrated portion A may be small.

In the intake system disclosed in Japanese Unexamined Utility Model Publication No. 57(1982)-101367, as shown in FIGS. 19 and 20, the opening E' of the upstream side intake passage E into the integrated portion D uniformly overlap with the openings F' of the discrete intake passages F into the integrated portion D. With this arrangement, it is expected that intake air introduced into the integrated portion D from the upstream side intake passage E is more uniformly distributed to the discrete intake passages F.

However, in the case of the integrated portion A shown in FIG. 18, the intake resistance cannot be sufficiently reduced depending on the shape of the integrated portion A, the relation between the areas of the end faces, the distance between the end faces and the like. Further even if the openings of the discrete intake passages F and the opening of the upstream side intake passage E are positioned relative to each other in the manner shown in FIG. 20, it is difficult to smoothly distribute intake air so long as intake air is distributed to many discrete intake passages from a single upstream side intake passage at one time.

SUMMARY OF THE INVENTION

In view of the foregoing observations and description, the primary object of the present invention is to provide an intake system having an integrated portion in which the intake resistance is more effectively reduced and the charging efficiency is further improved, thereby improving engine output power performance.

In accordance with the invention defined in claim 1 (will be referred to as "the first invention"), there is provided an intake system for a multiple-cylinder engine comprising a plurality of discrete intake passages which are substantially equal to each other in length and are connected to the respective cylinders at their downstream ends, an integrated chamber into which the upstream ends of the discrete intake passages are merged, and an upstream side intake passage which communicates the integrated chamber with the atmosphere, the integrated chamber having an upstream side end face and a downstream side end face, the cross-sectional area of the integrated chamber increasing from the upstream side end face to the downstream side end face, the upstream side intake passage having opening into the integrated portion in the upstream side end face, and the discrete intake passages respectively having openings into the integrated chamber in the downstream side end face, characterized in that formulae $$S_0 > 0.25 \times S_N$$

-continued $$H/\sqrt{S_1} > 0.7 \times (S_1/S_0)$$

are satisfied wherein $S_0$ and $S_1$ respectively represent the area of the upstream side and downstream side end faces of the integrated chamber, $S_N$ represents the sum of the areas of the openings of the discrete intake passages into the integrated chamber, and H represents the distance between the upstream side and downstream side end faces of the integrated chamber.

In accordance with the invention defined in claim 2 (will be referred to as "the second invention"), there is provided an intake system for a multiple-cylinder engine comprising a plurality of discrete intake passages which are substantially equal to each other in length and are connected to the respective cylinders at their downstream ends, an integrated chamber into which the upstream ends of the discrete intake passages are merged, and an upstream side intake passage which communicates the integrated chamber with the atmosphere, the integrated chamber having an upstream side end face and a downstream side end face, the cross-sectional area of the integrated chamber increasing from the upstream side end face to the downstream side end face, the upstream side intake passage having opening into the integrated chamber in the upstream side end face, and the discrete intake passages respectively having openings into the integrated chamber in the downstream side end face, characterized in that said upstream side intake passage comprises a downstream side end portion including a plurality of branch passages which are connected to the integrated chamber at their downstream side end and are merged into a second integrated chamber at their upstream side ends, and an upstream side end portion which opens to the atmosphere at its upstream side end and connected to the second integrated chamber at its downstream side end, the branch intake passages of the downstream side end portion being smaller than the discrete intake passages in number.

In accordance with the invention defined in claim 3 (will be referred to as "the third invention"), there is provided an intake system for a multiple-cylinder engine comprising a plurality of discrete intake passages which are substantially equal to each other in length and are connected to the respective cylinders at their downstream ends, a first integrated chamber into which the upstream ends of the discrete intake passages are merged, and an upstream side intake passage which communicates the first integrated chamber with the atmosphere, the first integrated chamber having an upstream side end face and a downstream side end face, the cross-sectional area of the first integrated chamber increasing from the upstream side end face to the downstream side end face, the upstream side intake passage having opening into the first integrated chamber in the upstream side end face, and the discrete intake passages respectively having openings into the first integrated chamber in the downstream side end face, characterized in that said upstream side intake passage comprises a downstream side end portion including a plurality of branch passages which are connected to the first integrated chamber at their downstream side end and are merged into a second integrated chamber at their upstream side ends, and an upstream side end portion which opens to the atmosphere at its upstream side end and connected to the second integrated chamber at its downstream side end, the branch intake passages of the downstream side end portion being smaller than the discrete intake passages in number and the openings of the branch passages into the first integrated chamber uniformly overlap with the openings of the discrete intake passages into the second integrated chamber.

When the area of the upstream side and downstream side end faces of the integrated chamber $S_0$ and $S_1$, the sum of the areas of the openings of the discrete intake passages into the integrated chamber $S_N$ and the distance H between the upstream side and downstream side end faces of the integrated chamber satisfy the aforesaid formulae, the intake resistance is reduced and the charging efficiency and the engine output power performance are substantially improved. The aforesaid has been empirically determined and it has been found that the engine output power substantially increases when the aforesaid formulae are satisfied.

Further when the intake passage is divided into the discrete intake passages in a plurality of stages as in the second invention, intake air can be more smoothly and more uniformly distributed to the cylinders and the intake resistance is more reduced than when the intake passage is divided into the discrete intake passages in a single stage.

When the openings of the branch passages into the first integrated chamber uniformly overlap with the openings of the discrete intake passages into the second integrated chamber as in the third invention, intake air can be more uniformly distributed to the discrete intake passages.

BRIEF DESCRIPTION OF THE DRAWINGS

FIG. 13 is a horizontal cross-sectional view of a part of the intake system shown in FIG. 12, FIG. 14 is a vertical cross-sectional view of a part of the intake system shown in FIG. 12, FIG. 15 is a cross-sectional view taken along line Y—Y in FIG. 13, FIGS. 16 and 17 are views similar to FIG. 15 but for illustrating other embodiments.

DESCRIPTION OF THE PREFERRED EMBODIMENT

Figure 1:
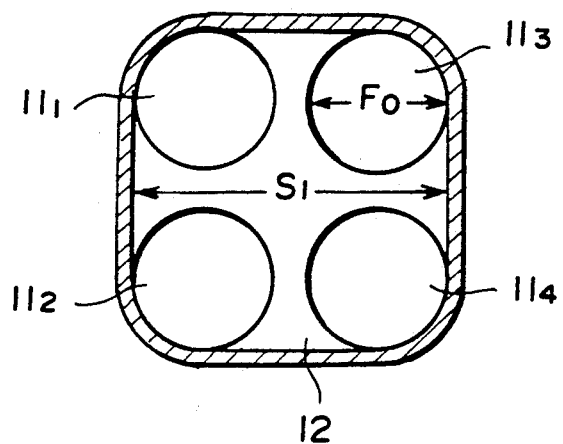
FIG. 1 is a horizontal cross-sectional view showing an intake system in accordance with an embodiment of the first invention.
Figure 2:
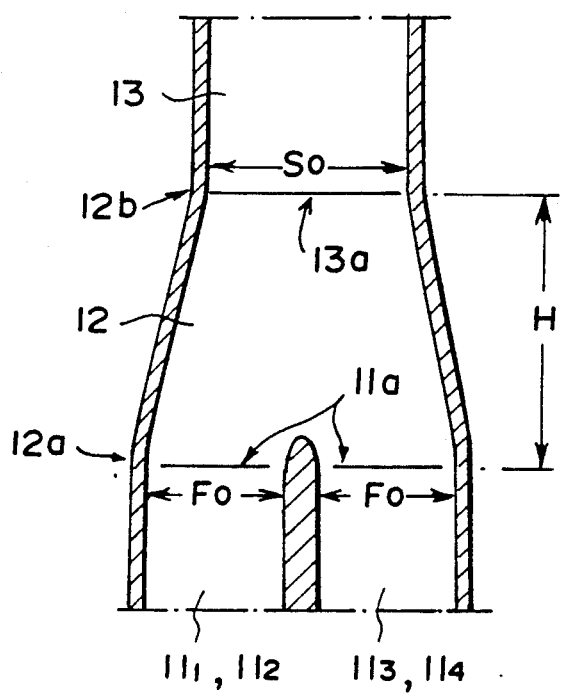
FIG. 2 is a vertical cross-sectional view of the intake system.
Figure 18:
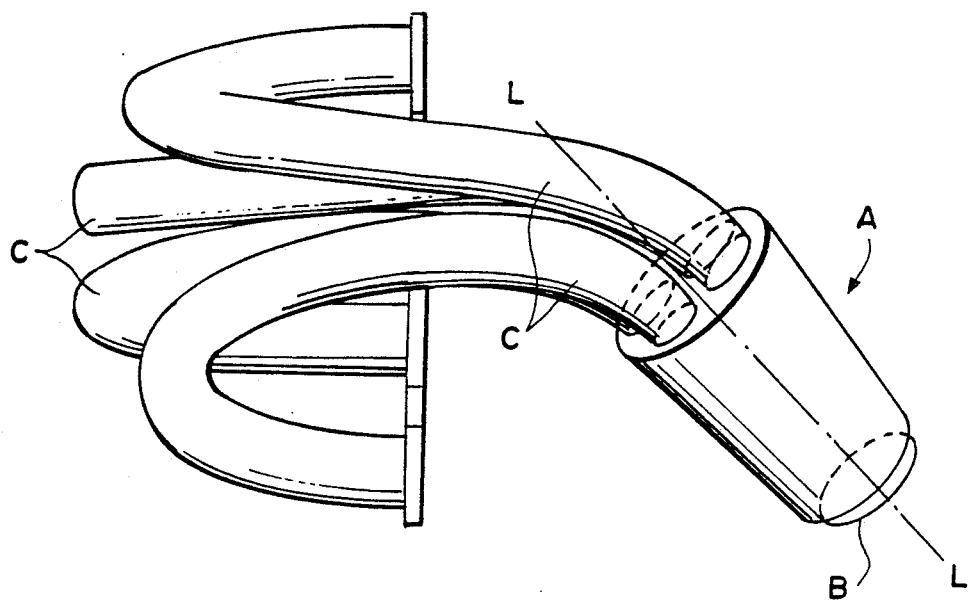
FIG. 18 is a perspective view showing an intake system in accordance with a prior art.
Figure 19:
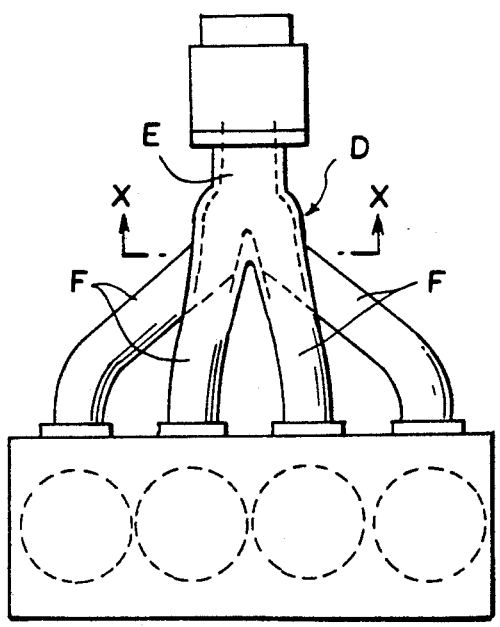
FIG. 19 is a plan view showing an intake system in accordance with another prior art.
Figure 20:
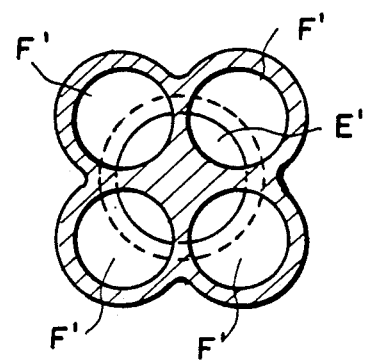
FIG. 20 is a cross-sectional view taken along line X—X in FIG. 19.

The intake system in accordance with an embodiment of the first invention shown in FIGS. 1 and 2 is substantially the same in structure as those shown in FIGS. 18 and 19, and has four discrete intake passages $11_1$ to $11_4$ which are connected to respective cylinders (not shown). The upstream ends of the discrete intake passages $11_1$ to $11_4$ are merged into an integrated chamber 12 and an upstream side intake passage 13 is connected to the integrated chamber 12 at its downstream end. An air cleaner (not shown) is mounted on the upstream end of the upstream side intake passage 13.

The upstream ends of the discrete intake passages $11_1$ to $11_4$ open (openings $11a$) into the integrated chamber 12 in the downstream side end face $12a$ thereof which is shaped to circumscribe the openings $11a$, and the downstream end of the upstream side intake passage 13 opens (openings $13a$) into the integrated chamber 12 in the upstream side end face $12b$ thereof. The cross-sectional area of the integrated chamber 12 smoothly increases from the upstream side end face $12b$ to the downstream side end face $12a$. The areas $S_0$ and $S_1$ of the upstream side and downstream side end faces $12b$ and $12a$ of the integrated chamber 12, the area Fo of the opening $11a$ of each discrete intake passage 11 into the integrated chamber 12 and the distance H between the upstream side and downstream side end faces $12b$ and $12a$ of the integrated chamber 12 are determined to satisfy the following formulae wherein $S_N$ represents the sum of the areas Fo of the openings $11a$ ($S_N = Fo \times 4$).

$$S_0 > 0.25 \times S_N \quad (1)$$

$$H/\sqrt{S_1} > 0.7 \times (S_1/S_0) \quad (2)$$

Figure 3:
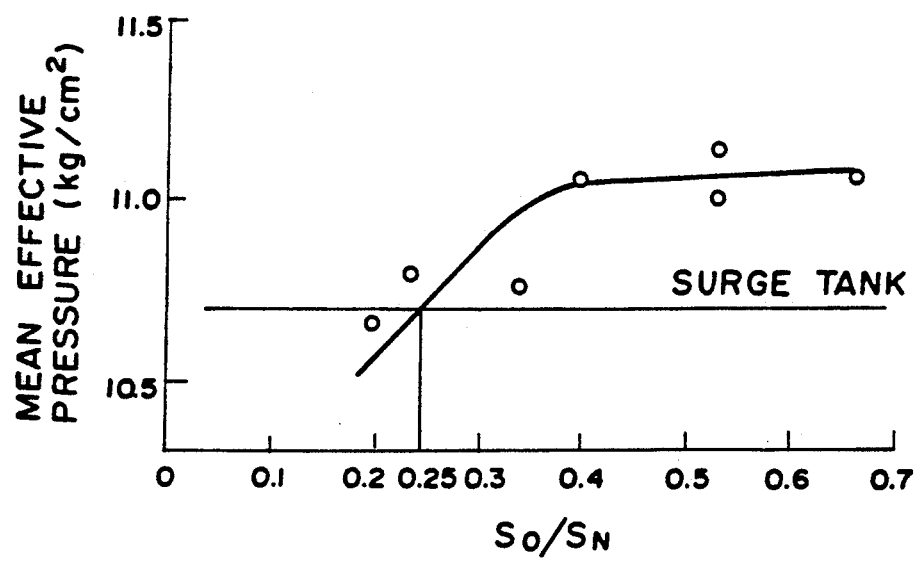
FIGS. 3 and 4 are graphs showing the result of experiments on the basis of which the first invention was made.
Figure 4:
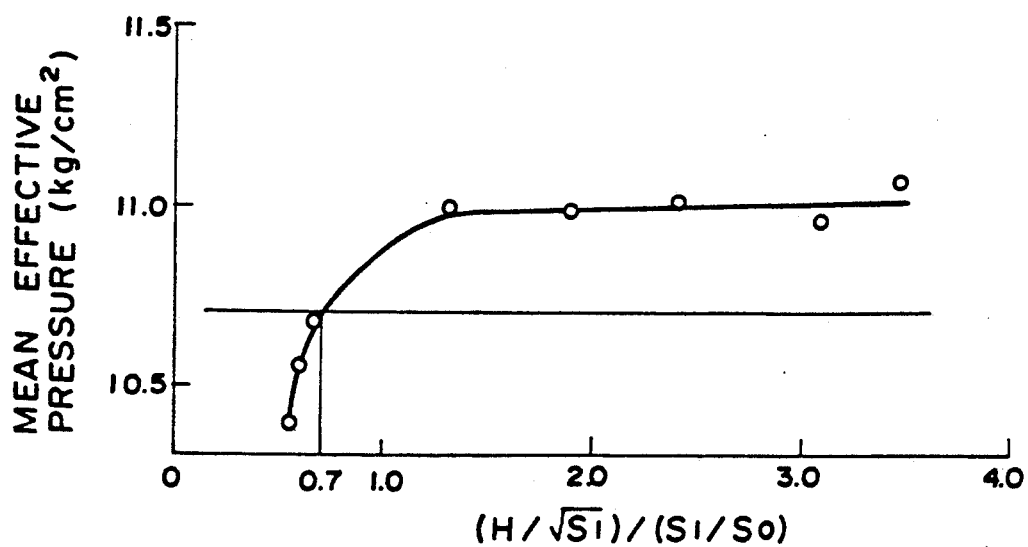

These formulae were empirically determined. Mean effective pressure at a tuning engine speed of inertia effect supercharging was measured for various values of the area ratio $S_0/S_N$, and it has been found that the mean effective pressure becomes higher than that in the intake system using the surge tank type integrated chamber when the area ratio $S_0/S_N$ is not larger than 0.25 as shown in FIG. 3. That is, when the area $S_0$ of the upstream side end face $12b$ (the area of the opening $13a$ of the upstream side intake passage 13 into the integrated chamber 12) is smaller than 25% of the sum $S_N$ of the areas Fo of the openings $11a$ of the discrete intake passages $11_1$ to $11_4$, the change in the cross-sectional area of the path of intake air from the upstream side intake passage 13 to the integrated chamber 12 or to the discrete intake passages $11_1$ to $11_4$ is too large and the intake resistance cannot be sufficiently reduced. Accordingly, it is necessary that the area $S_0$ of the upstream side end face $12b$ is set to satisfy the formula (1) in order to effectively reduce the intake resistance and increase the engine output power.

Further, mean effective pressure at a tuning engine speed of inertia effect supercharging was measured for various values of $(H/\sqrt{S_1})/(S_1/S_0)$, and it has been found that the mean effective pressure becomes higher than that in the intake system using the surge tank type integrated chamber when the value $(H/\sqrt{S_1})/(S_1/S_0)$ is larger than 0.7 as shown in FIG. 3. That is, it is necessary that the distance H between the upstream side and downstream side end faces $12b$ and $12a$ of the integrated chamber 12 is increased as the value $(S_1/S_0)$ increases in order to effectively reduce the intake resistance and increase the engine output power, and when the value $(H/\sqrt{S_1})$ is not smaller than 0.7 times the value $(S_1/S_0)$, the engine output power can be improved as compared with the intake system using the surge tank type integrated chamber.

Figure 5:
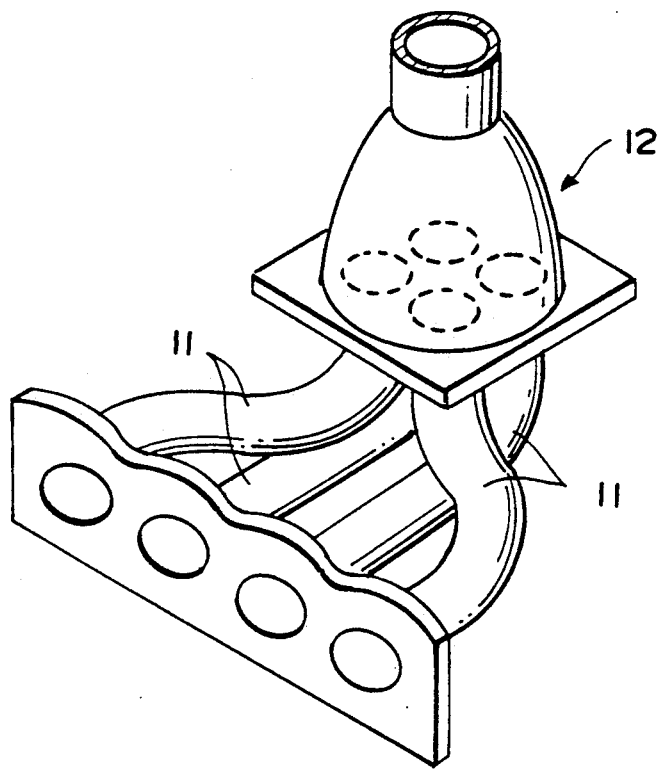
FIG. 5 is a perspective view showing an intake system in accordance with an embodiment of the first invention.
Figure 6:
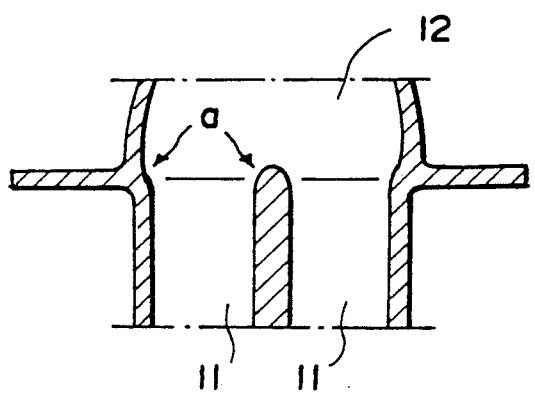
FIG. 6 is a cross-sectional view of the intake system.
Figure 7:
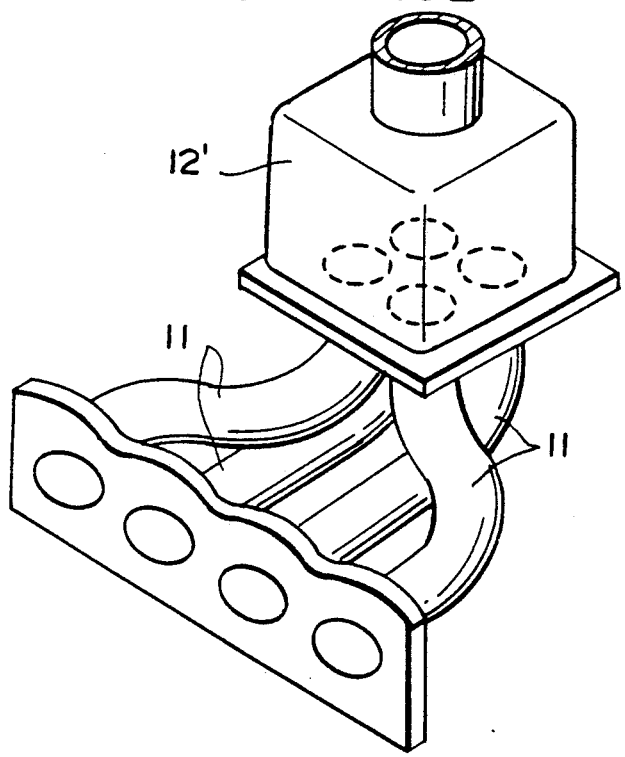
FIG. 7 is a perspective view showing a control intake system.
Figure 8:
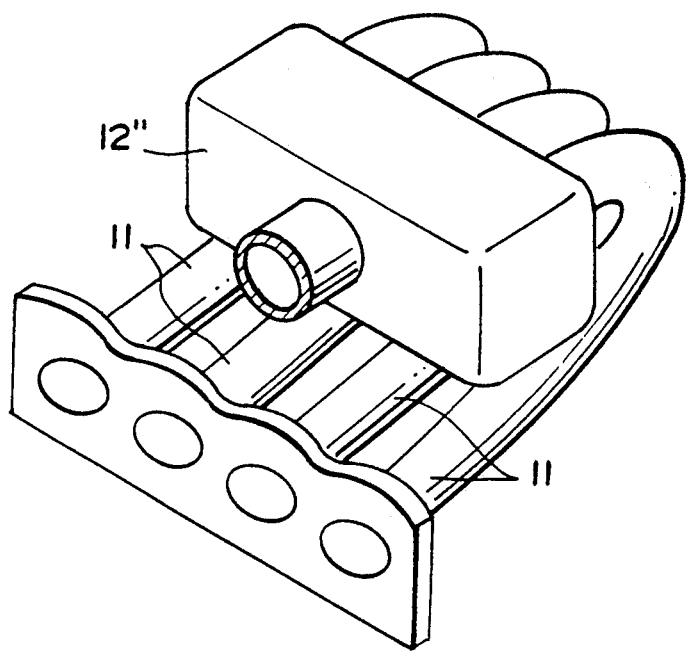
FIG. 8 is a perspective view showing an intake system provided with a surge tank type integrated chamber.

FIGS. 5 and 6 shows an intake system in accordance with an embodiment of the first invention. The intake system has an integrated chamber 12 the cross-sectional area of which smoothly increase from the upstream side end face to the downstream side end face. Four discrete intake passages 11 open in the downstream side end face of the integrated chamber 12, and the inner edge a of the upstream end of each discrete intake passages 11 is rounded. FIG. 7 shows a control intake system provided with an integrated chamber 12' the cross-sectional area of which is constant from the upstream side end face to the downstream side end face. In the case of the control intake system, the inner edge of the upstream end of each discrete intake passages 11 is not rounded. FIG. 8 shows an intake system provided with a conventional surge tank type integrated chamber 12''. In all the intake systems shown in FIGS. 5 to 8, the tuning engine speed of inertia supercharging is set to 4000 rpm, and the discrete intake passages are all 450 mm in length.

Figure 9:
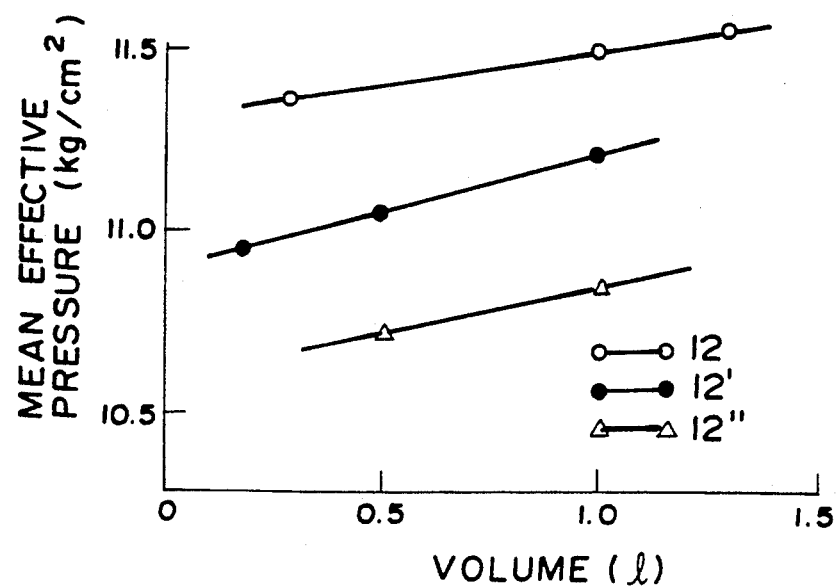
FIGS. 9 and 10 are graphs showing the result of experiments which were effected in order to prove the effect of the first invention.

In these intake systems respectively having the integrated chambers 12, 12' and 12'', change in mean effective pressure at the tuning engine speed with change of the volume of the integrated chamber was measured. The result was as shown in FIG. 9. Further change in mean effective pressure with change of the engine speed was measured while the volume of the integrated chamber was fixed to 1.0 l. The result was as shown in FIG. 10.

Figure 10:
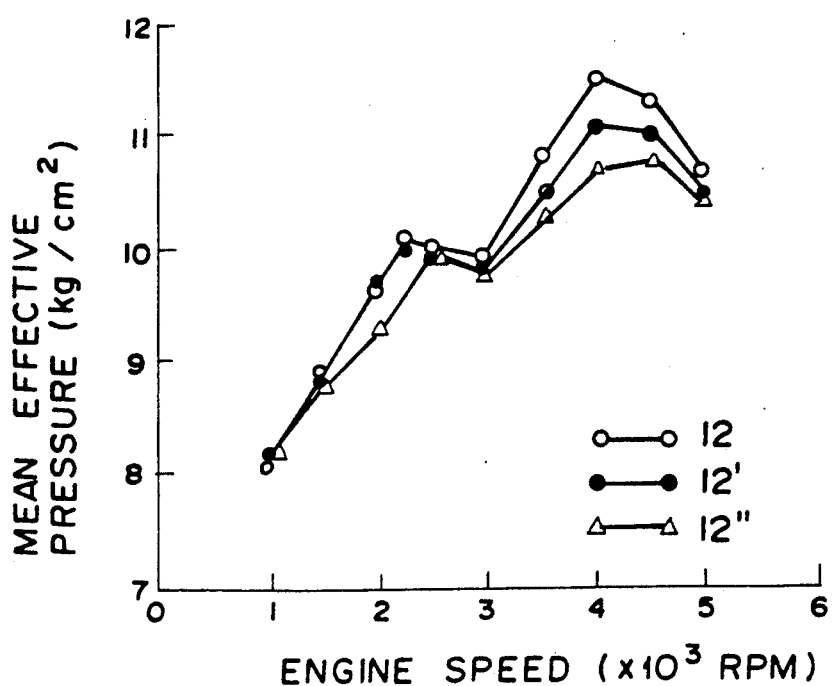

As can be understood from FIGS. 9 and 10, the engine output power performance was worst in the engine provided with the intake system having the surge tank type integrated chamber 12'', and was best in the engine provided with the intake system in accordance with the first invention. This means that the intake resistance is most effectively reduced in the integrated chamber 12 in accordance with the first invention.

Figure 11:
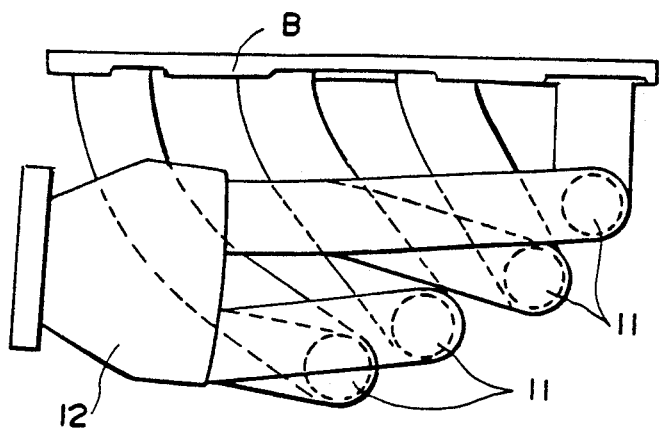
FIG. 11 is a plan view showing a modification of the intake system shown in FIG. 7.
Figure 12:
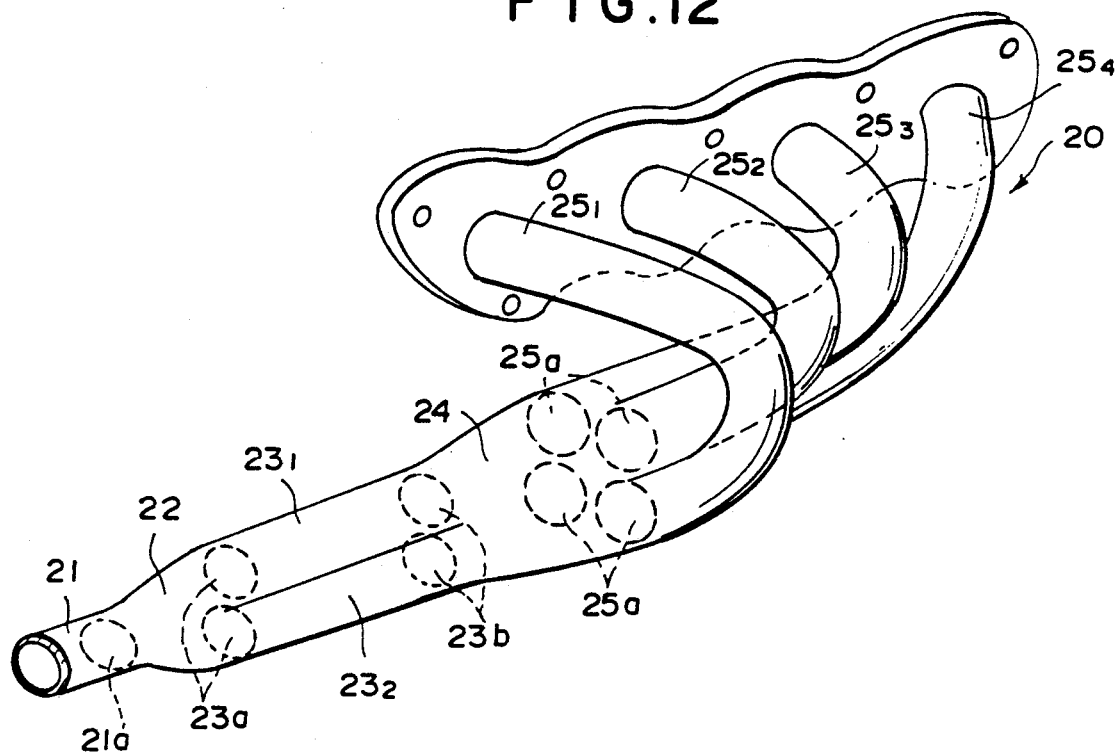
FIG. 12 is a perspective view showing an intake system in accordance with an embodiment of the second or third invention.

In order to more compactly arrange the engine (inclusive of the intake system) and reduce the height of the engine, it is preferred that the integrated chamber 12 be disposed on one side of the engine body and extend in the direction of the cylinder row as shown in FIG. 11. In FIG. 11, B denotes the engine body.

Now an embodiment of the second and third inventions will be described with reference to FIGS. 12 to 15, hereinbelow. In FIGS. 12 to 15, an intake manifold 20 comprises a first upstream side intake passage 21 which opens to the atmosphere through an air cleaner (not shown) mounted on the upstream end thereof, a first integrated chamber 22 to which the downstream end of the first upstream side intake passage 21 is connected, a pair of second upstream side intake passages $23_1$ and $23_2$ which extend downstream from the first integrated chamber 22, a second integrated chamber 24 to which the downstream ends of the second upstream side intake passages 23₁ and 23₂ are connected, and four discrete intake passages 25₁ to 25₄ which extend downstream from the second integrated chamber 24 and communicate with the respective cylinders.

The downstream side end face 22a of the first integrated chamber 22 is shaped to circumscribe the openings 23a of the second upstream side intake passages 23₁ and 23₂ into the first integrated chamber 22. The cross-sectional area of the first integrated chamber 22 smoothly increases from the upstream side end face 22b (in which the first upstream side intake passage 21 opens at an opening 21a) to the downstream side end face 22a. The axes of the openings 21a and 23a substantially conform to the axis of the first integrated chamber 22. Further the downstream side end face 24a of the second integrated chamber 24 is shaped to circumscribe the openings 25a of the discrete intake passages 25₁ and 25₄ into the second integrated chamber 24. The cross-sectional area of the second integrated chamber 24 smoothly increases from the upstream side end face 24b (in which the second upstream side intake passage 23₁ and 23₂ open at openings 23b) to the downstream side end face 24a. The axes of the openings 23b and 25a substantially conform to the axis of the second integrated chamber 24.

Further, as shown in FIG. 15, each of the openings 23b of the second upstream side intake passages 23₁ and 23₂ into the second integrated chamber 23 uniformly overlaps with two of the openings 25a of the four discrete intake passages 25₁ and 25₄ into the second integrated chamber 24.

In the intake manifold 20, intake flows into the first integrated chamber 22 through the first upstream side intake passage 21 and is distributed to the second upstream side intake passages 23₁ and 23₂, and then flows into the discrete intake passages 25₁ and 25₄ through the second integrated chamber 24. That is, intake air is first divided into two parts by the first integrated chamber 22 and then each part is further divided into two parts. Thus intake air is finally divided into four parts. With this arrangement, intake air can be more smoothly distributed to the discrete intake passages as compared with the system in which intake air is directly divided into a plurality of parts which are equal to the discrete intake passages in number, whereby the intake resistance is more effectively reduced and intake air is more uniformly distributed.

Further, since each of the openings 23b of the second upstream side intake passages 23₁ and 23₂ into the second integrated chamber 23 uniformly overlaps with two of the openings 25a of the four discrete intake passages 25₁ and 25₄ into the second integrated chamber 24, intake air flowing through each of the second upstream side intake passages is uniformly distributed to the two discrete intake passages, whereby intake air can be more uniformly distributed to the cylinders.

In this embodiment, it is preferred that each of the second upstream side intake passages 23₁ and 23₂ is provided with a throttle valve 26 as shown in FIG. 14. With this arrangement, the amount of intake air fed to the cylinders can be controlled with higher accuracy as compared with the case where a single throttle valve is provided in the first upstream side intake passage 21.

FIGS. 16 and 17 show other arrangements of the upstream side intake passages which communicate with the discrete intake passages by way of the integrated chamber which is positioned most downstream (the second integrated chamber in the case of the embodiment described above).

When the openings 35a of the four discrete intake passages are arranged in line, each of the openings 33b of the two upstream side intake passages is disposed to uniformly overlap with adjacent two of the openings 35a as shown in FIG. 16. When the openings 45a of six discrete intake passages are arranged as shown in FIG. 17, each of the openings 43b of the two upstream side intake passages is disposed to uniformly overlap with three of the openings 45a which are disposed at the respective apexes of a triangle.

We claim:

1. An intake system for a multiple-cylinder engine comprising a plurality of discrete intake passages which are substantially equal to each other in length and are connected to the respective cylinders at their downstream ends, an integrated chamber into which the upstream ends of the discrete intake passages are merged, and an upstream side intake passage which communicates the integrated chamber with the atmosphere, the integrated chamber having an upstream side end face and a downstream side end face, the cross-sectional area of the integrated chamber increasing from the upstream side end face to the downstream side end face, the upstream side intake passage opening into the integrated portion in the upstream side end face, and the discrete intake passages respectively having openings into the integrated chamber in the downstream side end face, characterized in that formulas $$S_0 > 0.25 \times S_N$$

$$H/\sqrt{S_1} > 0.7 \times (S_1/S_0)$$

are satisfied wherein $S_0$ and $S_1$ respectively represent the area of the upstream side and downstream side end faces of the integrated chamber, $S_N$ represents the sum of the areas of the openings of the discrete intake passages into the integrated chamber, and H represents the distance between the upstream side and downstream side end faces of the integrated chamber.

2. An intake system as defined in claim 1 in which the cross-sectional area of the integrated chamber gradually increases from the upstream side end face to the downstream side end face.

3. An intake system as defined in claim 1 in which the cross-sectional area of the integrated chamber smoothly increases from the upstream side end face to the downstream side end face.

4. An intake system as defined in claim 1 in which said engine has four cylinders, and the openings of said discrete intake passages to the integrated chamber are disposed on a circle, the opening of the upstream side intake passage into the integrated chamber being coaxial with the circle.

5. An intake system as defined in claim 4 in which said opening of the upstream side intake passage into the integrated chamber uniformly overlaps with the openings of said discrete intake passages to the integrated chamber.

6. An intake system for a multiple-cylinder engine comprising a plurality of discrete intake passages which are substantially equal to each other in length and are connected to the respective cylinders at their downstream ends, an integrated chamber into which the upstream ends of the discrete intake passages are merged, and upstream side intake passage means which communicates the integrated chamber with the atmosphere, the integrated chamber having an upstream side end face and a downstream side end face, the cross-sectional area of the integrated chamber increasing from the upstream side end face to the downstream side end face, the upstream side intake passage means opening into the integrated chamber in the upstream side end face, and the discrete intake passages respectively having openings into the integrated chamber in the downstream side end face, characterized in that said upstream side intake passage means comprises a downstream side end portion including a plurality of branch passage which are connected to the integrated chamber at their downstream side ends and are merged into a second integrated chamber at their upstream side ends, and an upstream side end portion which opens to the atmosphere at its upstream side end and connected to the second integrated chamber at its downstream side end, the branch intake passages of the downstream side end portion being smaller than the discrete intake passages in number.

7. An intake system as defined in claim 6 in which said engine has four cylinders, and said downstream side end portion of the upstream side intake passage means includes two branch passages and said upstream side end portion of the upstream side intake passage means includes a single passage.

8. An intake system as defined in claim 7 in which a pair of throttle valves are respectively provided in said branch passages of the downstream side end portion of the upstream side intake passage means.

9. An intake system for a multiple-cylinder engine comprising a plurality of discrete intake passages which are substantially equal to each other in length and are connected to the respective cylinders at their downstream ends, a first integrated chamber into which the upstream ends of the discrete intake passages are merged, and upstream side intake passage means which communicates the first integrated chamber with the atmosphere, the first integrated chamber having an upstream side end face and a downstream side end face, the cross-sectional area of the first integrated chamber increasing from the upstream side end face to the downstream side end face, the upstream side intake passage means opening into the first integrated chamber in the upstream side end face, and the discrete intake passages respectively having openings into the first integrated chamber in the downstream side end face, characterized in that said upstream side intake passage means comprises a downstream side end portion including a plurality of branch passages which are connected to the first integrated chamber at their downstream side end and are merged into a second integrated chamber at their upstream side ends, and an upstream side end portion which opens to the atmosphere at its upstream side end and connected to the second integrated chamber at its downstream side end, the branch intake passages of the downstream side end portion being smaller than the discrete intake passages in number and the openings of the branch passages into the first integrated chamber uniformly overlap with the openings of the discrete intake passages into the second integrated chamber.

10. An intake system as defined in claim 1, wherein the flow direction of the integrated chamber extends substantially in the direction of a cylinder row of the multiple-cylinder engine.

* * * * *